United States Patent
Sun et al.

(10) Patent No.: US 11,662,814 B2
(45) Date of Patent: May 30, 2023

(54) SIGHT POSITIONING METHOD, HEAD-MOUNTED DISPLAY DEVICE, COMPUTER DEVICE AND COMPUTER-READABLE STORAGE MEDIUM

(71) Applicants: Beijing BOE Optoelectronics Technology Co., Ltd., Beijing (CN); BOE Technology Group Co., Ltd., Beijing (CN)

(72) Inventors: Jiankang Sun, Beijing (CN); Hao Zhang, Beijing (CN); Lili Chen, Beijing (CN); Yachong Xue, Beijing (CN); Xinkai Li, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/555,230

(22) Filed: Dec. 17, 2021

(65) Prior Publication Data
US 2022/0269341 A1   Aug. 25, 2022
US 2022/0269341 A1   Aug. 25, 2022

(30) Foreign Application Priority Data
Feb. 19, 2021   (CN) .......................... 202110188536.0

(51) Int. Cl.
*G06F 3/01*    (2006.01)
*G06T 7/70*    (2017.01)

(52) U.S. Cl.
CPC ............... *G06F 3/013* (2013.01); *G06T 7/70* (2017.01); *G06T 2207/10048* (2013.01)

(58) Field of Classification Search
CPC . G06F 3/013; G06T 7/70; G06T 2207/10048; G02B 27/017; G02B 2027/0138; G02B 27/0093; G02B 27/0172
See application file for complete search history.

(56) References Cited

U.S. PATENT DOCUMENTS 6,373,961 B1 *  4/2002  Richardson ............. G06F 3/013
                                                              382/103
8,878,749 B1 *  11/2014  Wu .......................... G09G 5/00
                                                              351/209

(Continued)

*Primary Examiner* — Mihir K Rayan
(74) *Attorney, Agent, or Firm* — IPro, PLLC

(57) ABSTRACT

A sight positioning method, a head-mounted display device, a computer device, and a computer-readable storage medium are provided. The method includes: determining a first transform relation and a second transform relation, where the first transform relation is a transform relation between an image coordinate system and a light source coordinate system, and the second transform relation is a transform relation between the light source coordinate system and a display unit coordinate system; calculating coordinates of a pupil center in the image coordinate system according to an eye image of eyes of a user acquired by the image acquisition equipment; and obtaining coordinates of the pupil center serving as a fixation point position in the display unit coordinate system of the display unit according to the coordinates of the pupil center in the image coordinate system, the first transform relation and the second transform relation.

20 Claims, 3 Drawing Sheets

(56) References Cited

U.S. PATENT DOCUMENTS

| | | | | |
|---|---|---|---|---|
| 8,929,589 B2* | 1/2015 | Publicover | ............ | H04N 23/90 |
| | | | | 382/103 |
| 9,398,848 B2* | 7/2016 | Hansen | ............ | G06F 3/011 |
| 9,652,034 B2* | 5/2017 | He | ............ | G06F 3/013 |
| 10,585,477 B1* | 3/2020 | Cavin | ............ | G06F 3/013 |
| 2004/0174496 A1* | 9/2004 | Ji | ............ | G06F 18/2431 |
| | | | | 351/209 |
| 2014/0218281 A1* | 8/2014 | Amayeh | ............ | A61B 3/14 |
| | | | | 345/156 |
| 2017/0177075 A1* | 6/2017 | Zhang | ............ | G06V 40/19 |
| 2019/0361525 A1* | 11/2019 | Xiao | ............ | H04N 23/74 |

* cited by examiner

SIGHT POSITIONING METHOD, HEAD-MOUNTED DISPLAY DEVICE, COMPUTER DEVICE AND COMPUTER-READABLE STORAGE MEDIUM

CROSS-REFERENCE TO RELATED APPLICATIONS

This application claims priority to Chinese Patent Application No. 202110188536.0 filed in China on Feb. 19, 2021, the entire contents of which are incorporated herein by reference.

TECHNICAL FIELD

The present disclosure relates to the field of display technology, and in particular to a sight positioning method, a head-mounted display device, a computer device, and a computer-readable storage medium.

BACKGROUND

With the development of VR (Virtual Reality) technology, the application of eyeball tracking technology or sight tracking technology in VR interaction, sight point rendering, and the like has also received attention.

At present, sight positioning of a sight tracking system generally uses a polynomial regression model or a 3D geometric model for sight point calculation, and the input of the model is the pupil center in the eye image. Before the sight tracking system is used, the user is calibrated in a multi-point calibration mode, for example, a 5-point calibration mode or a 9-point calibration mode, so as to solve the model parameters suitable for the current user. According to the scheme, on one hand, before each use, the user needs to be subjected to multi-point calibration at least once, and the efficiency and the use convenience are low; on the other hand, in actual use, when the eye of the user slides relative to the initial calibration state (for example, when the eye of the user slides relative to the VR head-mounted display device), since the pupil center is an absolute value, the sight point error increases when the eye of the user deviates from the original calibration position during the relative sliding, and at this time, if the pupil center is still used as the model input, the computed sight point may drift seriously, the sight point computation accuracy is seriously reduced, and the experience is influenced.

SUMMARY

A sight positioning method is provided in the present disclosure, applied to a head-mounted display device, the head-mounted display device including a display unit, an image acquisition device and a light source, including:

determining a first transform relation and a second transform relation, where the first transform relation is a transform relation between an image coordinate system and a light source coordinate system, and the second transform relation is a transform relation between the light source coordinate system and a display unit coordinate system;

calculating coordinates of a pupil center in the image coordinate system according to an eye image of eyes of a user acquired by the image acquisition equipment; and obtaining coordinates of the pupil center serving as a fixation point position in the display unit coordinate system of the display unit according to the coordinates of the pupil center in the image coordinate system, the first transform relation and the second transform relation.

Optionally, the determining the first transform relationship includes:

forming a plurality of light spots on the eyes of the user by using a plurality of light sources, and acquiring the eye image of the eyes of the user containing the plurality of light spots by using the image acquisition equipment;

calculating coordinates of each light spot in the eye image of the user eye containing the plurality of light spots in the image coordinate system, and determining the coordinates of each light source in a light source coordinate system according to setting positions of the plurality of light sources; and calculating a first transform matrix between the image coordinate system and the light source coordinate system according to the coordinates of each light spot in the image coordinate system and the coordinates of the corresponding light source in the light source coordinate system, to determine the first transform relation.

Optionally, the first transform matrix includes linear transform coefficients and translational transform coefficients.

Optionally, the determining the second transform relationship includes:

determining the coordinates of each light source in a light source coordinate system according to setting positions of the plurality of light sources, and determining the coordinates of each light source in the display unit coordinate system according to a relative position relationship between the setting positions of the plurality of light sources and a setting position of the display unit; and calculating a second transform matrix between the light source coordinate system and the display unit coordinate system according to the coordinates of each light source in the light source coordinate system and the coordinates of the corresponding light source in the display unit coordinate system, to determine the second transform relation.

Optionally, the second transform matrix includes linear transform coefficients and translational transform coefficients.

A head-mounted display device is further provided in the present disclosure, including:

a plurality of light sources, an image acquisition device, a display unit, and a processor; where the image acquisition equipment is configured to acquire an eye image of eyes of a user under the irradiation of the light source;

the processor is configured to:

determine a first transform relation and a second transform relation, where the first transform relation is a transform relation between an image coordinate system and a light source coordinate system, and the second transform relation is a transform relation between the light source coordinate system and a display unit coordinate system;

calculate coordinates of a pupil center in the image coordinate system according to an eye image of eyes of a user acquired by the image acquisition equipment; and obtain coordinates of the pupil center serving as a fixation point position in the display unit coordinate system of the display unit according to the coordinates of the pupil center in the image coordinate system, the first transform relation and the second transform relation.

Optionally, the plurality of light sources are further configured to form a plurality of light spots on the eyes of the user;

the image acquisition equipment is further configured to acquire the eye image of the eyes of the user containing the plurality of light spots;

the processor is configured to:

calculate coordinates of each light spot in the eye image of the user eye containing the plurality of light spots in the image coordinate system, and determine the coordinates of each light source in a light source coordinate system according to setting positions of the plurality of light sources; and calculate a first transform matrix between the image coordinate system and the light source coordinate system according to the coordinates of each light spot in the image coordinate system and the coordinates of the corresponding light source in the light source coordinate system, to determine the first transform relation.

Optionally, the plurality of light sources are circumferentially distributed around a predetermined position on a plane parallel to a display surface of the display unit.

Optionally, the processor is configured to:

determine the coordinates of each light source in a light source coordinate system according to setting positions of the plurality of light sources, and determine the coordinates of each light source in the display unit coordinate system according to a relative position relationship between the setting positions of the plurality of light sources and a setting position of the display unit; and calculate a second transform matrix between the light source coordinate system and the display unit coordinate system according to the coordinates of each light source in the light source coordinate system and the coordinates of the corresponding light source in the display unit coordinate system, to determine the second transform relation.

Optionally, the head-mounted display device is a virtual reality head-mounted display device.

A computer device is further provided in the present disclosure, including a memory, a processor and a computer program stored on the memory and executable on the processor, where the processor is configured to execute the program to:

determine a first transform relation and a second transform relation, where the first transform relation is a transform relation between an image coordinate system and a light source coordinate system, and the second transform relation is a transform relation between the light source coordinate system and a display unit coordinate system;

calculate coordinates of a pupil center in the image coordinate system according to an eye image of eyes of a user acquired by the image acquisition equipment; and obtain coordinates of the pupil center serving as a fixation point position in the display unit coordinate system of the display unit according to the coordinates of the pupil center in the image coordinate system, the first transform relation and the second transform relation.

Optionally, the processor is configured to execute the program to:

form a plurality of light spots on the eyes of the user by using a plurality of light sources, and acquiring the eye image of the eyes of the user containing the plurality of light spots by using the image acquisition equipment;

calculate coordinates of each light spot in the eye image of the user eye containing the plurality of light spots in the image coordinate system, and determining the coordinates of each light source in a light source coordinate system according to setting positions of the plurality of light sources; and calculate a first transform matrix between the image coordinate system and the light source coordinate system according to the coordinates of each light spot in the image coordinate system and the coordinates of the corresponding light source in the light source coordinate system, to determine the first transform relation.

Optionally, the first transform matrix includes linear transform coefficients and translational transform coefficients.

Optionally, the processor is configured to execute the program to:

determine the coordinates of each light source in a light source coordinate system according to setting positions of the plurality of light sources, and determining the coordinates of each light source in the display unit coordinate system according to a relative position relationship between the setting positions of the plurality of light sources and a setting position of the display unit; and calculate a second transform matrix between the light source coordinate system and the display unit coordinate system according to the coordinates of each light source in the light source coordinate system and the coordinates of the corresponding light source in the display unit coordinate system, to determine the second transform relation.

Optionally, the second transform matrix includes linear transform coefficients and translational transform coefficients.

A computer-readable storage medium storing a computer program is further provide in the present disclosure, where the computer program is executed by a processor to perform the light positioning method according to claim 1.

Optionally, where the computer program is executed by the processor to: form a plurality of light spots on the eyes of the user by using a plurality of light sources, and acquiring the eye image of the eyes of the user containing the plurality of light spots by using the image acquisition equipment;

calculate coordinates of each light spot in the eye image of the user eye containing the plurality of light spots in the image coordinate system, and determining the coordinates of each light source in a light source coordinate system according to setting positions of the plurality of light sources; and calculate a first transform matrix between the image coordinate system and the light source coordinate system according to the coordinates of each light spot in the image coordinate system and the coordinates of the corresponding light source in the light source coordinate system, to determine the first transform relation.

Optionally, the first transform matrix includes linear transform coefficients and translational transform coefficients.

Optionally, the computer program is executed by the processor to:

determine the coordinates of each light source in a light source coordinate system according to setting positions of the plurality of light sources, and determining the coordinates of each light source in the display unit coordinate system according to a relative position relationship between the setting positions of the plurality of light sources and a setting position of the display unit; and calculate a second transform matrix between the light source coordinate system and the display unit coordinate system according to the coordinates of each light source in the light source coordinate system and the coordinates of the corresponding light source in the display unit coordinate system, to determine the second transform relation.

Optionally, the second transform matrix includes linear transform coefficients and translational transform coefficients.

BRIEF DESCRIPTION OF THE DRAWINGS

The following detailed description of the embodiments of the present disclosure is provided with reference to the accompanying drawings.

DETAILED DESCRIPTION

Figure 1:
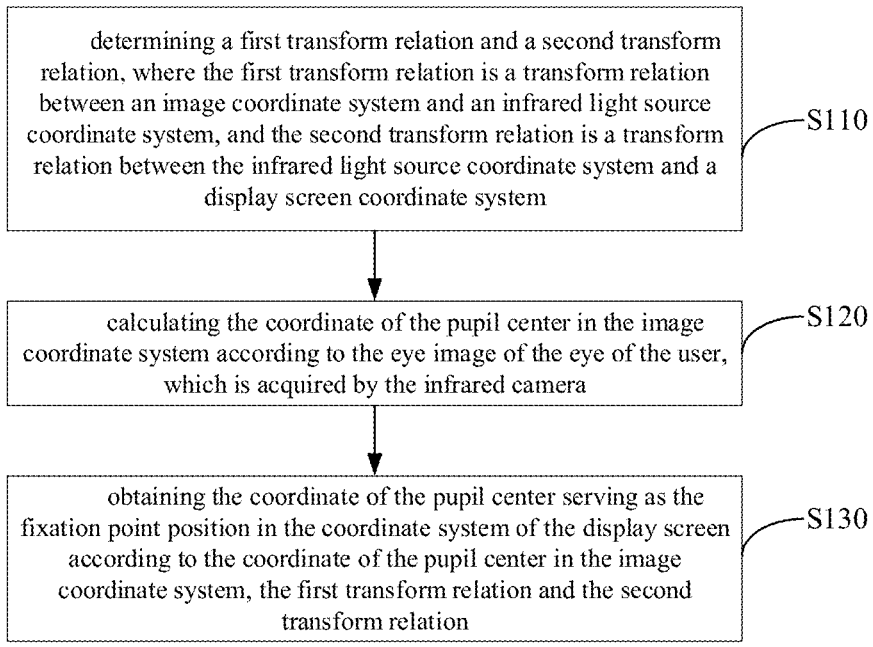
FIG. 1 shows a flowchart of a sight location method provided by an embodiment of the present disclosure.

In order to more clearly illustrate the disclosure, the disclosure is further described below with reference to the following examples and the accompanying drawings. Similar components in the figures are denoted by the same reference numerals. It is to be understood by persons skilled in the art that the following detailed description is illustrative and not restrictive, and is not to be taken as limiting the scope of the present disclosure.

In related art, for example, a sight positioning scheme of a head-mounted display device such as a VR head-mounted display device, a polynomial regression model or a 3D geometric model is usually used for performing sight point calculation, and an input of the model is a pupil center in an eye image. Before the sight tracking system is used, the user is calibrated in a multi-point calibration mode, for example, a 5-point calibration mode or a 9-point calibration mode, so as to solve the model parameters suitable for the current user. According to the scheme, on one hand, before each use, the user needs to be subjected to multi-point calibration at least once, and the efficiency and the use convenience are low; on the other hand, in actual use, when the eye of the user slides relative to the initial calibration state (for example, when the eye of the user slides relative to the VR head-mounted display device), since the pupil center is an absolute value, the sight point error increases when the eye of the user deviates from the original calibration position during the relative sliding, and at this time, if the pupil center is still used as the model input, the computed sight point may drift seriously, the sight point computation accuracy is seriously reduced, and the experience is influenced.

Thus, taking the application to a VR head-mounted display device including a display screen, an infrared camera, and an infrared light source as an example, an embodiment of the present disclosure provides a sight positioning method, as shown in FIG. 1, the method includes the following steps:

S110, determining a first transform relation and a second transform relation, where the first transform relation is a transform relation between an image coordinate system and an infrared light source coordinate system, and the second transform relation is a transform relation between the infrared light source coordinate system and a display screen coordinate system.

Figure 2:
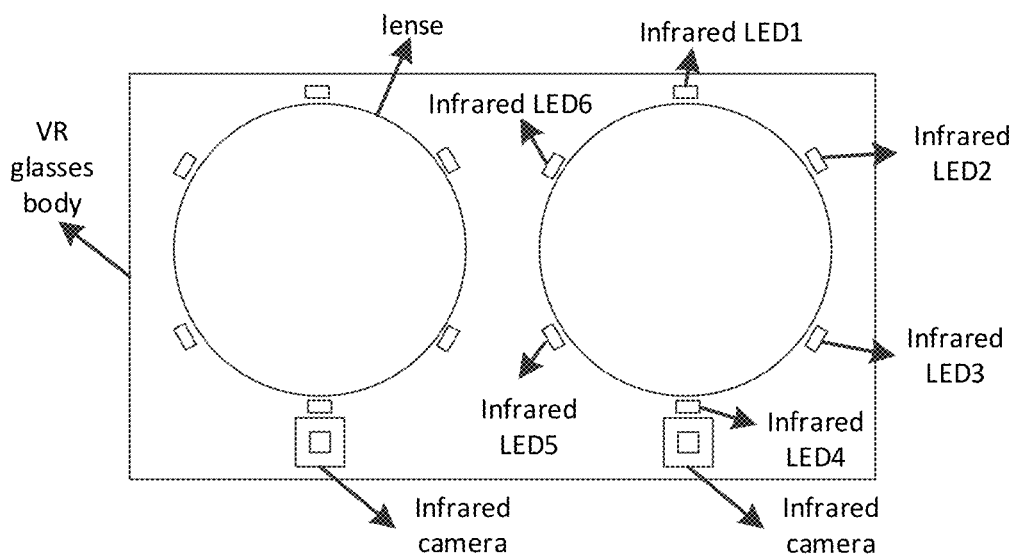
FIG. 2 shows a schematic structural diagram of a VR head-mounted display device.

In a specific example, as shown in FIG. 2, the VR head-mounted display device related to the present embodiment includes: a housing, a VR display screen (not shown in FIG. 2), two infrared cameras, two lenses, and a plurality of infrared light sources. The two lenses are, for example, fresnel lenses respectively, and are disposed at positions right in front of the left eye and the right eye of a user wearing the VR head-mounted display device. A plurality of infrared light sources are arranged in a plane parallel to the display surface of the display screen, and on one hand, the light compensation device can provide even light for eyes and is beneficial to obtaining clear eye images, so that pupils can be segmented from iris areas. Wherein, the quantity of infrared light source can be 6, 8, 10, 12 etc. for example, two lenses that FIG. 2 shows use the display screen center to set up as the midpoint symmetry at the horizontal direction, VR head-mounted display device includes twelve infrared light sources, six circumference equipartitions are outside the lens of left side, six circumference equipartitions are outside the lens of right side (infrared LED1 to infrared LED6 in FIG. 2), namely, for example, infrared LED1 to infrared LED6 use the lens center of right side as center circumference equipartition, can guarantee the effect of light filling and the precision of sight location like this. Two infrared cameras correspond the setting respectively in the below of two lenses for when gathering respectively that the user wears VR head-mounted display device, the eye image that contains pupil and facula of left eye and right eye under infrared light source shines. In addition, only one infrared camera can be arranged to collect eye images of the left eye and the right eye for subsequent sight positioning. It should be noted that, in the VR head-mounted display device related to this embodiment, the reason why the infrared light source is selected is that it does not affect the user to watch the display screen, and it can be understood that, in the VR head-mounted display device related to this disclosure, other types of light sources may also be selected and a corresponding type of camera may be adaptively selected.

In the following examples, only the right infrared camera captures the eye images of the right eye illuminated by the infrared LEDs 1 to 6, and the coordinate system transform relationship and the pupil center position mapping are described.

In one possible implementation, determining the first transform relationship (the transform relationship of the image coordinate system and the infrared light source coordinate system) includes:

forming a plurality of light spots on the eyes of a user by using a plurality of infrared light sources, and acquiring eye images of the eyes of the user containing the light spots by using the infrared camera;

calculating coordinates of each light spot in the eye image of the user eye containing the plurality of light spots in an image coordinate system, and determining the coordinates of each infrared light source in an infrared light source coordinate system according to the setting positions of the plurality of infrared light sources; and calculating a first transform matrix between the image coordinate system and the infrared light source coordinate system according to the coordinates of each light spot in the image coordinate system and the coordinates of the corresponding infrared light source in the infrared light source coordinate system so as to determine the first transform relation.

Therefore, the transform relation between the image coordinate system and the infrared light source coordinate system can be accurately and efficiently determined, and the coordinates of the pupil center in the image coordinate system can be accurately mapped into the coordinates of the pupil center under the infrared light source coordinate system in the subsequent steps.

In one possible implementation, the first transform matrix includes linear transform coefficients and translational transform coefficients.

Figure 3:
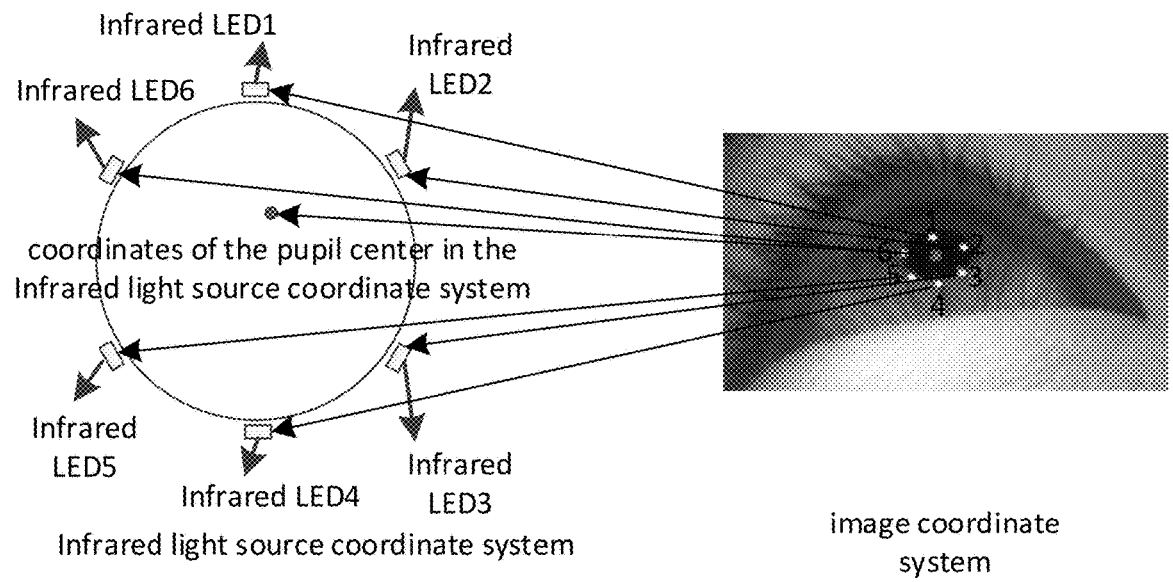
FIG. 3 shows a schematic diagram of the correspondence between the image coordinate system and the infrared light source coordinate system.

Continuing with the previous example, as shown in FIG. 3, the coordinates of the centers of the infrared LEDs 1 to 6 under the infrared light source coordinate system are [($x_1$, $y_1$), . . . , ($x_6$, $y_6$)], which can be obtained according to the preset mounting positions of the six infrared light sources, where, referring to FIG. 3, it is further described that in the present embodiment, the infrared light source coordinate system refers to a rectangular coordinate system in the plane of the infrared light sources. The infrared LEDs 1 to infrared LED6 can form six light spots in the right eye of the user, and the gray value of the light spots (infrared light spots) is higher after the cornea of the eye of the user is imaged, so that the eye images of the eye of the user, which include the six light spots and are collected by the infrared camera, of the six light spots can be segmented by adopting an adaptive threshold algorithm, then connected regions are obtained, and the center of mass of the six light spot connected regions is obtained, so that the coordinates of the centers of the six light spots formed by the infrared LEDs 1 to infrared LED6 in an image coordinate system are respectively [($x_1'$, $y_1'$), . . . , ($x_6'$, $y_6'$)], where, referring to FIG. 3, in this embodiment, the image coordinate system refers to a rectangular coordinate system of the eye image.

The relationship between the coordinates [($x_1$, $y_1$), . . . , ($x_6$, $y_6$)] of the centers of the infrared LEDs 1 to the infrared LED6 in the infrared light source coordinate system and the coordinates [($x_1'$, $y_1'$), . . . , ($x_6'$, $y_6'$)] of the centers of the six light spots in the image coordinate system can be expressed as [($x_1$, $y_1$), . . . , ($x_6$, $y_6$)] obtained by subjecting [($x_1'$, $y_1'$), . . . , ($x_6'$, $y_6'$)] to linear transform and translational transform, for example:

$$x_i = m11*x_i' + m12*y_i' + m13$$

$$y_i = m21*x_i' + m22*y_i' + m23$$

expressed in matrix form as follows:

$$\begin{bmatrix} x_i \\ y_i \\ 1 \end{bmatrix} = \begin{bmatrix} m11 & m12 & m13 \\ m21 & m22 & m23 \\ 0 & 0 & 1 \end{bmatrix} \begin{bmatrix} x_i' \\ y_i' \\ 1 \end{bmatrix} = A \cdot \begin{bmatrix} x_i' \\ y_i' \\ 1 \end{bmatrix}$$

the matrix A is used as a first transform matrix between the image coordinate system and the infrared light source coordinate system, and represents a first transform relation (the transform relation between the image coordinate system and the infrared light source coordinate system). m11, m12, m21, m22 are linear transform coefficients of matrix A, and m13 and m23 are translational transform coefficients of matrix A.

It should be noted that the first transform relationship may be determined when a user uses the VR head display for the first time, and stored in the memory of the VR head display device, or may be determined by a tester through testing before the VR head display device leaves the factory. When the mapping of the pupil center position is needed in the subsequent step, the processor of the VR head-mounted display device can directly read from the memory. Because the relative position of the infrared camera and the infrared light source is unchanged, no matter relative sliding (sliding between the head of the user and the VR head-mounted display device) occurs or the user is replaced in the process that the user wears the VR head-mounted display device, the conversion relation of the light spots between the image coordinate system and the infrared light source coordinate system is fixed and unchanged, and the first conversion relation does not need to be determined again.

In one possible implementation, determining the second transform relationship (the transform relationship between the infrared light source coordinate system and the display screen coordinate system) includes:

determining the coordinates of each infrared light source $_{in\ an}$ infrared light source coordinate system according to the setting positions of the plurality of infrared light sources, and determining the coordinates of each infrared light source under a display screen coordinate system according to the relative position relationship between the setting positions of the plurality of infrared light sources and the setting position of the display screen; and calculating a second transform matrix between the infrared light source coordinate system and the display screen coordinate system according to the coordinates of the infrared light sources under the infrared light source coordinate system and the coordinates of the corresponding infrared light sources under the display screen coordinate system so as to determine the second transform relation.

Therefore, the transform relation between the infrared light source coordinate system and the display screen coordinate system can be accurately and efficiently determined, and the accurate mapping of the pupil center position from the infrared light source coordinate system to the display screen coordinate system can be realized in the subsequent steps.

In one possible implementation, the second transform matrix includes linear transform coefficients and translational transform coefficients.

Figure 4:
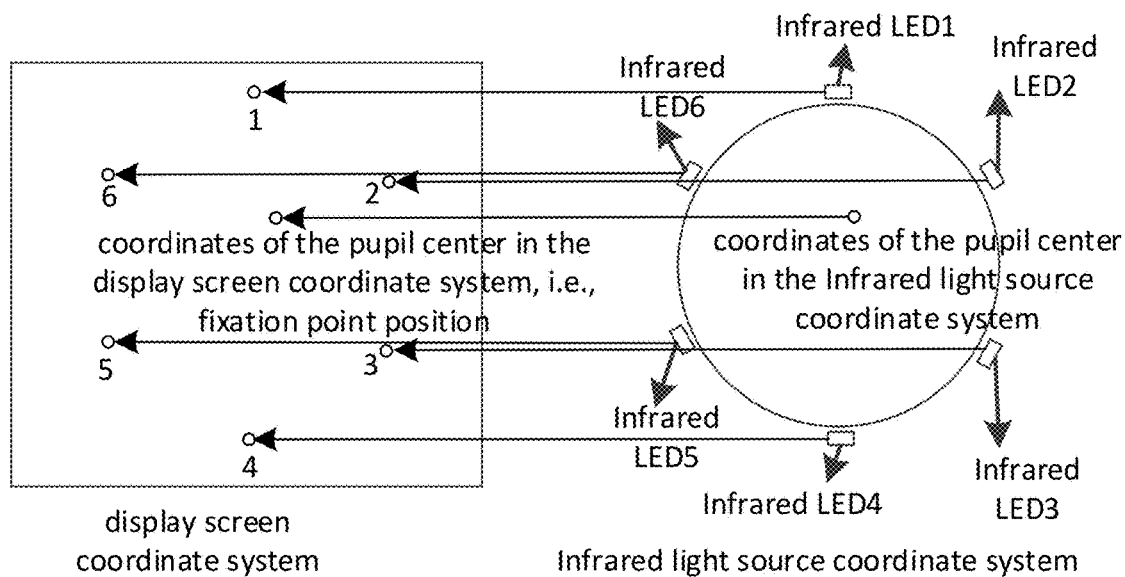
FIG. 4 is a schematic diagram showing a correspondence relationship between the infrared light source coordinate system and the display screen coordinate system.

Continuing with the previous example, as shown in FIG. 4, the centers of the infrared LEDs 1 to 6 are respectively [($x_1$, $y_1$), . . . , ($x_6$, $y_6$)] in the infrared light source coordinate system, which can be obtained according to the preset mounting positions of the six infrared light sources. The coordinates of the centers of the infrared LEDs 1 to 6 under the display screen coordinate system are [($X_1$, $Y_1$), . . . , ($X_6$, $Y_6$)], which can be obtained according to the relative position relationship between the preset installation positions of the six infrared light sources and the preset installation position of the display screen, where, as further described with reference to FIG. 4, in the present embodiment, the display screen coordinate system refers to a rectangular coordinate system in the display plane of the display screen.

The relationship between the coordinates of the centers of the infrared LEDs 1 to 6 in the display screen coordinate system [($X_1$, $Y_1$), . . . , ($X_6$, $Y_6$)] and the coordinates of the centers of the infrared LEDs 1 to 6 in the infrared light source coordinate system [($X_1$, $Y_1$), . . . , ($X_6$, $Y_6$)] can be expressed as [($X_1$, $Y_1$), . . . , ($X_6$, $Y_6$)] obtained by subjecting [($X_1$, $Y_1$), . . . , ($X_6$, $Y_6$)] to linear transform and translational transform, for example:

$$X_i = n11*x_i + n12*y_i + n13$$

$$Y_i = n21*x_i + n22*y_i + n23$$

expressed in matrix form as follows:

$$\begin{bmatrix} X_i \\ Y_i \\ 1 \end{bmatrix} = \begin{bmatrix} n11 & n12 & n13 \\ n21 & n22 & n23 \\ 0 & 0 & 1 \end{bmatrix} \begin{bmatrix} x_i \\ y_i \\ 1 \end{bmatrix} = B \cdot \begin{bmatrix} x_i \\ y_i \\ 1 \end{bmatrix}$$

the matrix B is used as a second transform matrix between the infrared light source coordinate system and the display screen coordinate system, and represents a second transform relation (the transform relation between the infrared light source coordinate system and the display screen coordinate system). n11, n12, n21, n22 are the linear transform coefficients of matrix B, and n13 and n23 are the translational transform coefficients of matrix B.

It should be noted that the second transform relationship may be predetermined, for example, determined before the VR head-mounted display device leaves the factory, and stored in the memory of the VR head-mounted display device. When the mapping of the pupil center position is needed in the subsequent step, the processor of the VR head-mounted display device can directly read from the memory. Because the relative position of the display screen and the infrared light source is unchanged, no matter relative sliding (sliding between the head of the user and the VR head-mounted display device) or the situation of replacing the user occurs in the process that the user wears the VR head-mounted display device, the transform relation between the infrared light source coordinate system and the display screen coordinate system is fixed and unchanged, and the second transform relation does not need to be determined again.

S120, calculating the coordinate of the pupil center in the image coordinate system according to the eye image of the eye of the user, which is acquired by the infrared camera.

In a specific example, the pupil area may be separated from an eye image of the user's eye collected by an infrared camera by using an adaptive threshold segmentation algorithm, then the pupil edge is detected by using a Canny edge detection algorithm, and ellipse fitting is performed by using the detected edge points, so as to obtain a value of the fitted pupil center in an image coordinate system.

S130, obtaining the coordinate of the pupil center serving as the fixation point position in the coordinate system of the display screen according to the coordinate of the pupil center in the image coordinate system, the first transform relation and the second transform relation.

Continuing with the foregoing example, the value $(p_x', p_y')$ of the pupil center in the image coordinate system may be first mapped to the coordinates $(p_x, p_y)$ in the infrared light source coordinate system according to the first transform relation:

$$\begin{bmatrix} p_x \\ p_y \\ 1 \end{bmatrix} = A \cdot \begin{bmatrix} p_x' \\ p_y' \\ 1 \end{bmatrix} = \begin{bmatrix} m11 & m12 & m13 \\ m21 & m22 & m23 \\ 0 & 0 & 1 \end{bmatrix} \begin{bmatrix} p_x' \\ p_y' \\ 1 \end{bmatrix}$$

then, according to a second transform relation, mapping the coordinates $(p_x, p_y)$ of the pupil center in the infrared light source coordinate system to the coordinates $(P_x, P_y)$ of the pupil center in the display screen coordinate system:

$$\begin{bmatrix} P_x \\ P_y \\ 1 \end{bmatrix} = B \cdot \begin{bmatrix} p_x \\ p_y \\ 1 \end{bmatrix} = \begin{bmatrix} n11 & n12 & n13 \\ n21 & n22 & n23 \\ 0 & 0 & 1 \end{bmatrix} \begin{bmatrix} p_x \\ p_y \\ 1 \end{bmatrix}$$

thus, the position of the fixation point on the display screen is obtained, and the sight positioning is completed.

It should be noted that steps S120 and S130 are performed in real time during the sight positioning process.

In summary, the sight positioning method provided in this embodiment performs two coordinate system transforms on the coordinates of the pupil center, that is, maps the pupil center position from the image coordinate system to the infrared light source coordinate system, and then maps to the display screen coordinate system, so as to obtain the coordinates of the pupil center as the sight point position in the display screen coordinate system, thereby implementing sight positioning. As can be seen, the sight positioning method provided by this embodiment converts the pupil center position into a relative value of a light spot formed on the eye of the user with respect to the infrared light source, where the relative value is only related to the change of the sight point and is not related to relative sliding (for example, sliding occurs between the head of the user and the VR head-mounted display device). Therefore, the reduction of the sight positioning accuracy caused by relative sliding can be avoided. And a mode of carrying out sight positioning or fixation point position calculation based on the position of the pupil center relative to the light spot is adopted, and calibration is not needed. Because the relative position between the infrared camera and the infrared light source is not changed (for example, under the conditions that the head of a user slides relative to the VR head-mounted display device, the user using the VR head-mounted display device is replaced, and the like, the relative position between the infrared camera and the infrared light source is not changed), the transform relation of the light spot between the image coordinate system and the infrared light source coordinate system is fixed and unchanged; similarly, because the relative position of the display screen and the infrared light source is unchanged, the transform relation of the light spots between the infrared light source coordinate system and the display screen coordinate system is also fixed and unchanged. Therefore, the coordinate of the pupil center in the image coordinate system is obtained only by calculation according to the user eye image acquired in real time, and the sight positioning result can be accurately and efficiently obtained according to the two transform relations. In conclusion, the sight positioning method provided by the embodiment can accurately and efficiently realize sight positioning, does not need to calibrate, and improves the precision, efficiency, stability and convenience of the sight tracking system.

The above embodiments only take application to VR head-mounted display devices as an example to describe the sight positioning method provided by the present disclosure, and it can be understood by those skilled in the art that, besides VR head-mounted display devices, the sight positioning method provided by the present disclosure can also be applied to other head-mounted display devices such as AR head-mounted display devices.

Another embodiment of the present disclosure provides a head-mounted display device including: the system includes a plurality of infrared light sources, infrared cameras, a display screen and a processor;

the infrared camera is configured to acquire eye images of the eyes of the user under the irradiation of the infrared light source;

the processor is configured to determine a first transform relation and a second transform relation, where the first transform relation is a transform relation between an image coordinate system and an infrared light source coordinate system, and the second transform relation is a transform relation between the infrared light source coordinate system and a display screen coordinate system; calculating the coordinates of the pupil center in an image coordinate system according to the eye images of the eyes of the user; and obtaining the coordinate of the pupil center serving as the fixation point position in the coordinate system of the display screen according to the coordinate of the pupil center in the image coordinate system, the first transform relation and the second transform relation.

In one possible implementation of the method according to the invention, the infrared light sources are further configured to form a plurality of light spots on the eyes of the user;

the infrared camera is further configured to acquire an eye image of the user's eyes containing the plurality of light spots;

the processor, configured to determine the first transform relationship, includes: calculating coordinates of each light spot in the eye image of the user eye containing the plurality of light spots in an image coordinate system, and determining the coordinates of each infrared light source in an infrared light source coordinate system according to the setting positions of the plurality of infrared light sources; and calculating a first transform matrix between the image coordinate system and the infrared light source coordinate system according to the coordinates of each light spot in the image coordinate system and the coordinates of the corresponding infrared light source in the infrared light source coordinate system so as to determine the first transform relation.

In a possible implementation manner, in a plane parallel to the display surface of the display screen, the plurality of infrared light sources are circumferentially and uniformly distributed by taking a preset position on the plane as a center. For example, wear display device for VR wear display device, a plurality of infrared light sources use VR wear display device's lens center as the center, and the circumference equipartition is peripheral at the lens.

In one possible implementation manner, the processor, configured to determine the second transform relationship, includes: determining the coordinates of each infrared light source in an infrared light source coordinate system according to the setting positions of the plurality of infrared light sources, and determining the coordinates of each infrared light source under a display screen coordinate system according to the relative position relationship between the setting positions of the plurality of infrared light sources and the setting position of the display screen; and calculating a second transform matrix between the infrared light source coordinate system and the display screen coordinate system according to the coordinates of the infrared light sources under the infrared light source coordinate system and the coordinates of the corresponding infrared light sources under the display screen coordinate system so as to determine the second transform relation.

In one possible implementation, the head-mounted display device is a VR head-mounted display device.

It should be noted that the principle and the workflow of the head-mounted display device provided in this embodiment are similar to those of the above sight positioning method, and taking the head-mounted display device as the VR head-mounted display device as an example, the structure of the VR head-mounted display device is similar to that of the VR head-mounted display device illustrated in the above embodiment, and related parts may refer to the above description, which is not repeated herein.

Figure 5:
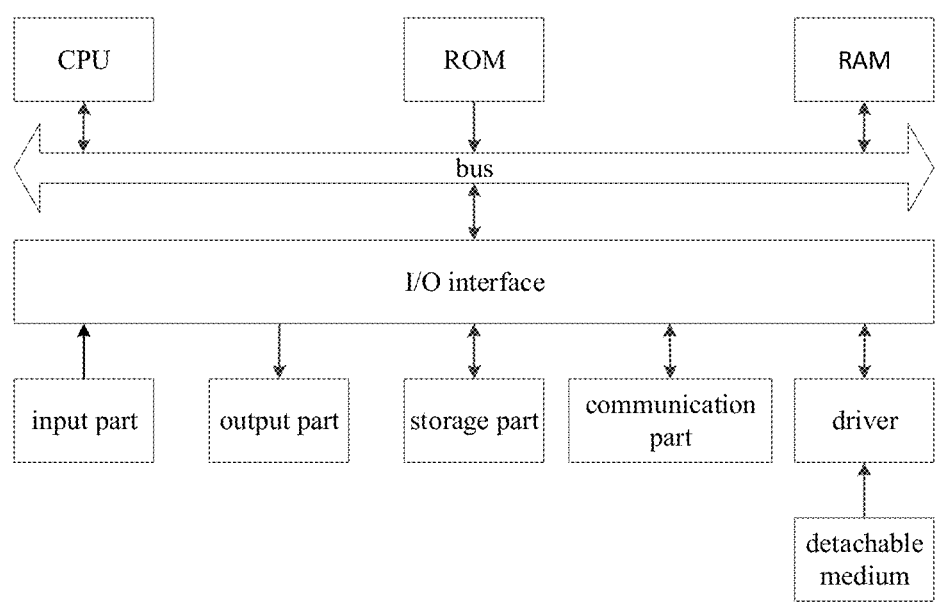
FIG. 5 shows a schematic structural diagram of a computer system.

As shown in FIG. 5, a computer system adapted to execute the sight positioning method provided by the above-described embodiments includes a central processing module (CPU) that can perform various appropriate actions and processes according to a program stored in a Read Only Memory (ROM) or a program loaded from a storage section into a Random Access Memory (RAM). In the RAM, various programs and data necessary for the operation of the computer system are also stored. The CPU, ROM and RAM are connected thereto via a bus. An input/output (I/O) interface is also connected to the bus.

The following components are connected to the I/O interface: an input section including a keyboard, a mouse, and the like; an output section including a speaker and the like such as a Liquid Crystal Display (LCD); a storage section including a hard disk and the like; and a communication section including a network interface card such as a LAN card, a modem, or the like. The communication section performs communication processing via a network such as the internet. The drive is also connected to the I/O interface as needed. A removable medium such as a magnetic disk, an optical disk, a magneto-optical disk, a semiconductor memory, or the like is mounted on the drive as needed, so that the computer program read out therefrom is mounted into the storage section as needed.

In particular, the processes described by the above flowcharts may be implemented as computer software programs according to the present embodiment. For example, the present embodiments include a computer program product including a computer program tangibly embodied on a computer-readable medium, the computer program including program code for performing the method illustrated in the flow chart. In such an embodiment, the computer program may be downloaded and installed from a network via the communication section, and/or installed from a removable medium.

The flowchart and schematic diagrams in the figures illustrate the architecture, functionality, and operation of possible implementations of systems, methods and computer program products according to the present embodiments. In this regard, each block in the flowchart or schematic diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the schematic and/or flowchart illustration, and combinations of blocks in the schematic and/or flowchart illustration, can be implemented by special purpose hardware-based systems which perform the specified functions or acts, or combinations of special purpose hardware and computer instructions.

On the other hand, the embodiment also provides a nonvolatile computer storage medium, which may be the nonvolatile computer storage medium included in the apparatus in the above embodiment, or may be a nonvolatile computer storage medium that exists separately and is not installed in a terminal. The non-transitory computer storage medium stores one or more programs that, when executed by a device, cause the device to:

determining a first transform relation and a second transform relation, where the first transform relation is the transform relation between an image coordinate system and an infrared light source coordinate system, and the second transform relation is the transform relation between the infrared light source coordinate system and a display screen coordinate system;

calculating coordinates of the pupil center in an image coordinate system according to eye images of the eyes of the user acquired by the infrared camera; and obtaining the coordinate of the pupil center serving as the fixation point position in the coordinate system of the display screen according to the coordinate of the pupil center in the image coordinate system, the first transform relation and the second transform relation.

In the description of the present disclosure, it should be noted that the terms "upper", "lower", and the like indicate orientations or positional relationships based on the orientations or positional relationships shown in the drawings, which are merely for convenience of describing the present disclosure and simplifying the description, but do not indicate or imply that the referred device or element must have a specific orientation, be configured and operated in a specific orientation, and thus, should not be construed as limiting the present disclosure. Unless expressly stated or limited otherwise, the terms "mounted," "connected," and "coupled" are to be construed broadly and encompass, for example, both fixed and removable coupling as well as integral coupling; can be mechanically or electrically connected; they may be connected directly or indirectly through intervening media, or they may be interconnected between two elements. The specific meaning of the above terms in the present disclosure can be understood as a specific case by a person of ordinary skill in the art.

It should also be noted that, in the description of the present disclosure, relational terms such as first and second, and the like are used solely to distinguish one entity or action from another entity or action without necessarily requiring or implying any actual such relationship or order between such entities or actions. Also, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. Without further limitation, an element defined by the phrase "including an . . . " does not exclude the presence of other identical elements in the process, method, article, or apparatus that includes the element.

It should be understood that the above-described embodiments of the present disclosure are merely examples for clearly illustrating the disclosure and are not intended to limit the embodiments of the disclosure, and that those skilled in the art, on the basis of the above description, may make other variations or modifications, which are not exhaustive of all embodiments, and obvious variations or modifications of the embodiments disclosed are within the scope of the disclosure.

What is claimed is:

1. A sight positioning method, applied to a head-mounted display device, the head-mounted display device comprising a display unit, an image acquisition device and a light source, comprising:

determining a first transform relation and a second transform relation, wherein the first transform relation is a transform relation between an image coordinate system and a light source coordinate system, and the second transform relation is a transform relation between the light source coordinate system and a display unit coordinate system;

calculating coordinates of a pupil center in the image coordinate system according to an eye image of eyes of a user acquired by the image acquisition equipment; and obtaining coordinates of the pupil center serving as a fixation point position in the display unit coordinate system of the display unit according to the coordinates of the pupil center in the image coordinate system, the first transform relation and the second transform relation.

2. The method according to claim 1, wherein the determining the first transform relationship comprises:

forming a plurality of light spots on the eyes of the user by using a plurality of light sources, and acquiring the eye image of the eyes of the user containing the plurality of light spots by using the image acquisition equipment;

calculating coordinates of each light spot in the eye image of the user eye containing the plurality of light spots in the image coordinate system, and determining the coordinates of each light source in a light source coordinate system according to setting positions of the plurality of light sources; and calculating a first transform matrix between the image coordinate system and the light source coordinate system according to the coordinates of each light spot in the image coordinate system and the coordinates of the corresponding light source in the light source coordinate system, to determine the first transform relation.

3. The method according to claim 2, wherein the first transform matrix comprises linear transform coefficients and translational transform coefficients.

4. The method according to claim 1, wherein the determining the second transform relationship comprises:

determining the coordinates of each light source in a light source coordinate system according to setting positions of the plurality of light sources, and determining the coordinates of each light source in the display unit coordinate system according to a relative position relationship between the setting positions of the plurality of light sources and a setting position of the display unit; and calculating a second transform matrix between the light source coordinate system and the display unit coordinate system according to the coordinates of each light source in the light source coordinate system and the coordinates of the corresponding light source in the display unit coordinate system, to determine the second transform relation.

5. The method according to claim 4, wherein the second transform matrix comprises linear transform coefficients and translational transform coefficients.

6. A head-mounted display device, comprising:

a plurality of light sources, an image acquisition device, a display unit, and a processor; wherein the image acquisition equipment is configured to acquire an eye image of eyes of a user under the irradiation of the light source;

the processor is configured to:

determine a first transform relation and a second transform relation, wherein the first transform relation is a transform relation between an image coordinate system and a light source coordinate system, and the second transform relation is a transform relation between the light source coordinate system and a display unit coordinate system;

calculate coordinates of a pupil center in the image coordinate system according to an eye image of eyes of a user acquired by the image acquisition equipment; and obtain coordinates of the pupil center serving as a fixation point position in the display unit coordinate system of the display unit according to the coordinates of the pupil center in the image coordinate system, the first transform relation and the second transform relation.

7. The head-mounted display device according to claim 6, the plurality of light sources are further configured to form a plurality of light spots on the eyes of the user;
the image acquisition equipment is further configured to acquire the eye image of the eyes of the user containing the plurality of light spots;
the processor is configured to:
calculate coordinates of each light spot in the eye image of the user eye containing the plurality of light spots in the image coordinate system, and determine the coordinates of each light source in a light source coordinate system according to setting positions of the plurality of light sources; and
calculate a first transform matrix between the image coordinate system and the light source coordinate system according to the coordinates of each light spot in the image coordinate system and the coordinates of the corresponding light source in the light source coordinate system, to determine the first transform relation.

8. The head-mounted display device according to claim 6, wherein the plurality of light sources are circumferentially distributed around a predetermined position on a plane parallel to a display surface of the display unit.

9. The head-mounted display device according to claim 6, wherein the processor is configured to:
determine the coordinates of each light source in a light source coordinate system according to setting positions of the plurality of light sources, and determine the coordinates of each light source in the display unit coordinate system according to a relative position relationship between the setting positions of the plurality of light sources and a setting position of the display unit; and calculate a second transform matrix between the light source coordinate system and the display unit coordinate system according to the coordinates of each light source in the light source coordinate system and the coordinates of the corresponding light source in the display unit coordinate system, to determine the second transform relation.

10. The head-mounted display device according to claim 6, wherein the head-mounted display device is a virtual reality head-mounted display device.

11. A computer device, comprising a memory, a processor and a computer program stored on the memory and executable on the processor, wherein the processor is configured to execute the program to:
determine a first transform relation and a second transform relation, wherein the first transform relation is a transform relation between an image coordinate system and a light source coordinate system, and the second transform relation is a transform relation between the light source coordinate system and a display unit coordinate system;
calculate coordinates of a pupil center in the image coordinate system according to an eye image of eyes of a user acquired by the image acquisition equipment; and
obtain coordinates of the pupil center serving as a fixation point position in the display unit coordinate system of the display unit according to the coordinates of the pupil center in the image coordinate system, the first transform relation and the second transform relation.

12. The computer device according to claim 11, wherein the processor is configured to execute the program to:
form a plurality of light spots on the eyes of the user by using a plurality of light sources, and acquiring the eye image of the eyes of the user containing the plurality of light spots by using the image acquisition equipment;
calculate coordinates of each light spot in the eye image of the user eye containing the plurality of light spots in the image coordinate system, and determining the coordinates of each light source in a light source coordinate system according to setting positions of the plurality of light sources; and
calculate a first transform matrix between the image coordinate system and the light source coordinate system according to the coordinates of each light spot in the image coordinate system and the coordinates of the corresponding light source in the light source coordinate system, to determine the first transform relation.

13. The computer device according to claim 12, wherein the first transform matrix comprises linear transform coefficients and translational transform coefficients.

14. The computer device according to claim 11, wherein the processor is configured to execute the program to:
determine the coordinates of each light source in a light source coordinate system according to setting positions of the plurality of light sources, and determining the coordinates of each light source in the display unit coordinate system according to a relative position relationship between the setting positions of the plurality of light sources and a setting position of the display unit; and
calculate a second transform matrix between the light source coordinate system and the display unit coordinate system according to the coordinates of each light source in the light source coordinate system and the coordinates of the corresponding light source in the display unit coordinate system, to determine the second transform relation.

15. The computer device according to claim 14, wherein the second transform matrix comprises linear transform coefficients and translational transform coefficients.

16. A non-transitory computer-readable storage medium storing a computer program, wherein the computer program is executed by a processor to perform the sight positioning method according to claim 1.

17. The non-transitory computer-readable storage medium according to claim 16, wherein the computer program is executed by the processor to:
form a plurality of light spots on the eyes of the user by using a plurality of light sources, and acquiring the eye image of the eyes of the user containing the plurality of light spots by using the image acquisition equipment;
calculate coordinates of each light spot in the eye image of the user eye containing the plurality of light spots in the image coordinate system, and determining the coordinates of each light source in a light source coordinate system according to setting positions of the plurality of light sources; and
calculate a first transform matrix between the image coordinate system and the light source coordinate system according to the coordinates of each light spot in the image coordinate system and the coordinates of the corresponding light source in the light source coordinate system, to determine the first transform relation.

18. The non-transitory computer-readable storage medium according to claim 17, wherein the first transform matrix comprises linear transform coefficients and translational transform coefficients.

19. The non-transitory computer-readable storage medium according to claim 16, wherein the computer program is executed by the processor to:
- determine the coordinates of each light source in a light source coordinate system according to setting positions of the plurality of light sources, and determining the coordinates of each light source in the display unit coordinate system according to a relative position relationship between the setting positions of the plurality of light sources and a setting position of the display unit; and
- calculate a second transform matrix between the light source coordinate system and the display unit coordinate system according to the coordinates of each light source in the light source coordinate system and the coordinates of the corresponding light source in the display unit coordinate system, to determine the second transform relation.

20. The non-transitory computer-readable storage medium according to claim 19, wherein the second transform matrix comprises linear transform coefficients and translational transform coefficients.

* * * * *